United States Patent [19]
Rudish et al.

[11] Patent Number: 5,430,453
[45] Date of Patent: Jul. 4, 1995

[54] CYLINDRICAL PHASED ARRAY ANTENNA SYSTEM TO PRODUCE WIDE-OPEN COVERAGE OF A WIDE ANGULAR SECTOR WITH HIGH DIRECTIVE GAIN AND MODERATE CAPABILITY TO RESOLVE MULTIPLE SIGNALS

[75] Inventors: Ronald M. Rudish, Commack; Scott F. Hall, Plainview, both of N.Y.

[73] Assignee: Ail Systems, Inc., Deer Park, N.Y.

[21] Appl. No.: 81,959

[22] Filed: Jun. 29, 1987

[51] Int. Cl.$^6$ .............................................. H01Q 3/22
[52] U.S. Cl. ..................................................... 342/373
[58] Field of Search ................................. 342/372, 373

[56] References Cited

U.S. PATENT DOCUMENTS

| | | | |
|---|---|---|---|
| 4,316,192 | 2/1982 | Acoraci | 342/373 |
| 4,414,550 | 11/1983 | Tressett | 342/373 |
| 4,652,879 | 3/1987 | Rudish et al. | 342/373 X |

OTHER PUBLICATIONS

Patent Application U.S. Ser. No. 719,460 filed Nov. 20, 1984 by R. Rudish.
Patent Application U.S. Ser. No. 807,871 filed Oct. 28, 1985 by R. Rudish and S. Hall.
Patent Application U.S. Ser. No. 899,629 filed Aug. 21, 1986 by R. Rudish and S. Hall.
Patent Application U.S. Ser. No. 011,051 filed Dec. 29, 1986 by R. Rudish and S. Hall.
Barton, David K., "Radar Systems Analysis", pp. 221–223, Artech House Inc., 1976.

*Primary Examiner*—Mark Hellner
*Attorney, Agent, or Firm*—Donald A. Rowe

[57] ABSTRACT

A cylindrical phased array antenna system capable of scanning at rates faster than the information rate of signals being received so that no information is lost by the scanning process. The array is configured to add the capability to provide multidimensional separation of multiple signals and to eliminate the sensitivity loss due to sampling. The cylindrical phased array is comprised of the means to decompose the distribution of current on the radiator elements caused by wave incidence into component signals which are the Fourier spatial harmonics of the distribution, heterodyne means to differentially phase shift these component signals at rates exceeding 4 $\pi$ radians per cycle of the highest frequency present in the information content of the incident wave, and means to form multiple complex-weighted sums (beams) of the component signals.

The means for beam summation selectively forms a coherent sum at only one of its multiplicity of output ports, the particular port being a periodic function of the signal frequency. The ambiguities which arise in frequency measurement capabilities due to the periodicity are resolved by auxiliary means for coarse frequency measurement.

3 Claims, 1 Drawing Sheet

CYLINDRICAL PHASED ARRAY ANTENNA SYSTEM TO PRODUCE WIDE-OPEN COVERAGE OF A WIDE ANGULAR SECTOR WITH HIGH DIRECTIVE GAIN AND MODERATE CAPABILITY TO RESOLVE MULTIPLE SIGNALS

BACKGROUND OF THE INVENTION

1. Field of the Invention

This invention relates to cylindrical electronically scanned antenna systems which scan at rates faster than the information being processed and more particularly to improvements in the signal combining subsystem of such systems to simultaneously achieve high values of directive gain and separation of multiple signals based on frequency, time-of-arrival and direction-of-arrival.

2. Description of the Related Art

It is sometimes desirable to configure a system to receive all of the electromagnetic signals within the receiver's capabilities as limited by its sensitivity and bandwidth. Signals of interest are usually incident from widely diverse directions. Therefore, prior systems have utilized antennas having a wide azimuth beam width, such as omnidirectional antennas, as the system's receptor.

A severe limitation of this approach is that it does not permit directional resolution of multiple signals. Such resolution is usually desirable to prevent garbling of signals that cannot otherwise be resolved in frequency or time-of-occurrence. Directional resolution is also desirable in cases where the direction of incidence of the signals is to be estimated.

To overcome these disadvantages, alternative prior art systems have been configured using narrow-beam antennas. In one case, multiple antennas, each producing a narrow beam, are arranged in a circular pattern so that their beams are contiguous and point radially outward. In another case, a single cylindrical array antenna is configured to form multiple beams which are contiguous and point radially outward. In both cases, each beam port of the antenna(s) is connected to a separate receiver, thus the system can exhibit the advantages of both good directional resolution and complete, simultaneous directional coverage. However, the disadvantage in this case is the high cost of the multiple receivers.

Another class of prior art systems attempts to achieve omnidirectional coverage with a single narrow beam by scanning that beam as a function of time. In these systems, a narrow beam is scanned over all azimuths by mechanical rotation of a fixed-beam antenna, or by electronic scan of a cylindrical array antenna. The disadvantage in this case is that the beam cannot look everywhere at once.. This is especially a problem for multiple signals from diverse directions if they are non-repetitive in character or have rapidly changing wave forms (high information rate or short-pulse signals). These high information rate signals may not be sampled at a sufficient rate by the scanning beam to prevent information loss.

More recently, techniques have been disclosed which address the problems associated with directional resolution of multiple signals. Our patent application, U.S. patent application Ser. No. 719,460, filed Nov. 20 1984, provided a cylindrical array antenna system capable of scanning a narrow beam through its complete coverage sector at a rate at least twice as fast as the maximum information rate of the signals it receives so that no information is lost. This allows the system to scan within the time period of the shortest pulse which it is expected to receive and thereby have a high probability of intercepting and receiving that signal. This system provided angular resolution of multiple signals and the capabilities of determining their direction of arrival commensurate with the narrow beam widths of a full N element cylindrical array. The system provided the same sensitivity and angular resolution regardless of the direction of signal incidence. These improvements were the result of using heterodyne techniques to achieve very rapid scanning of a single beam throughout the antenna's entire sector of coverage.

This technique, however, does result in a sensitivity loss due to sampling. This loss occurs because the scanning beam is only directed at the angle of incidence for a short period of time during a scan. The scanning beam will intercept the incident signal for only 1/Nth of the scanning period. The sampling loss in dB is given by 10 log N. This degrades the sensitivity to that of a single element of the array or less.

Our more recent patent application, U.S. patent application Ser. No. 807,871, filed Oct. 28, 1985, describes an antenna system which provides multiple scanning beams to eliminate the sampling loss of the prior art. Our still more recent patent application, U.S. application Ser. No. 899,629, herein incorporated by reference filed Aug. 21 , 1986 describes an improved antenna system which covers wider bandwidth than that described in U.S. patent application Ser. No. 807,871 and also provides the ability to resolve multiple signals by their time-of-arrival, direction-of-arrival and frequency. Most recently, our patent application U.S. patent application Ser. No. 011,051, filed Dec. 29, 1986, describes another wideband antenna system which is more hardware efficient than that described in U.S. patent application Ser. No. 899,629, but which does not resolve multiple signals by their frequency. The present invention also creates multiple scanning beams which are used in a wide bandwidth arrangement to eliminate the sampling loss of the prior art. The present invention, however, is distinguished by its use of a different arrangement to provide fewer system outputs, rendering the present invention more practical than the art of U.S. patent application Ser. No. 899,629, while retaining most of the frequency resolution capability of this prior art.

SUMMARY OF THE INVENTION

It is, therefore, an object of the present invention to provide a cylindrical array antenna system capable of scanning through its complete coverage sector, at least twice as fast as the maximum information rate of the signals it receives so that no information is lost. This capability will allow the antenna to scan within the time period of the shortest pulse which it is expected to receive and thereby the antenna will have the same high probability of intercepting that signal as could be achieved with an omnidirectional antenna.

It is another object of the present invention to achieve the gain available from the full cylindrical array by recovering the signal loss which occurs in the cylindrical arrays of other systems due to sampling the signal during only a portion of its time of presence, Another object of the invention is to provide multidimensional resolution of multiple incident signals, sorting them by their time-of-arrival, direction-of-arrival and frequency.

It is yet another object of the present invention to provide the ability to determine the frequencies of multiple incident signals and the ability to determine their direction-of-arrival commensurate with the narrow beamwidth achievable with a full N element cylindrical array.

It is another object of the present invention to receive incident signals with the same sensitivity and resolution regardless of the direction of signal incidence.

Another object of the present invention is to gain the advantages of the above objects using fewer components than are required for multiple beam antenna systems that require separate complete receivers for each beam.

Another object of the present invention is to gain the advantages of the above objects using fewer outputs than required for earlier cylindrical array antenna systems such as the invention of U.S. patent application Ser. No. 899,629.

In general, the present invention, an apparatus for adding the capability to separate multiple signals and for eliminating the sampling loss of signal energy in systems having a coverage sector through which the antenna system scans multiple beams at a rate that is faster than the information rate being received, comprises:

(a) a cylindrical phased array antenna comprising a plurality of radiator elements evenly spaced around a circular arc;

(b) means for decomposing the distribution of current on the radiator elements caused by electromagnetic wave incidence into component signals which are the Fourier spatial harmonics of the distribution;

(c) means for forming a plurality of beams of sensitivity from said component signals, said plurality of beams of sensitivity being equal in number to the number of antenna elements in said circular arc, the beams being contiguous and considered as lying in the azimuth plane for reference purposes, with each beam being generally evenly spaced from adjacent beams in $\theta$ space, where $\theta$ is the angle away from boresight in the azimuthal plane, the spacing between beam center directions in $\theta$ space being generally proportional to the reciprocal of the number of antenna elements, and the beams, taken together to form a larger composite beam, span the entire azimuth coverage sector;

(d) means for differentially weighting the amplitude of said component signals to achieve a desired time invariant relative weighting of the signals for beam shape control;

(e) means for differentially delaying and phase shifting said component signals to achieve a desired time invariant relative phasing of the signals for beam focusing;

(f) means for differentially phase shifting these component signals at rates exceeding $4\pi$ radians per cycle of the highest frequency present in the information content of the incident electromagnetic wave for synchronously scanning each of the beams over the entire coverage sector, the beams maintaining their relative positions adjacent one another in $\pi$ space during scanning, the scanning being carried out periodically at a rate that is at least twice as fast as the highest information rate being received;

(g) means for accepting signals received by each beam and differentially delaying said beam signals to cause their modulation envelopes to respond in unison to a single emitting source at a particular azimuth angle;

(h) means for coherently combining said beam signals after said signals have been differentially delayed, said means for combining being arranged to cause coherent addition selectively at different output ports of said combiner for different signal frequencies; and (i) means for measuring an approximate frequency of said combined beam signals for eliminating ambiguities in determination of signal frequency.

BRIEF DESCRIPTION OF THE DRAWING

For a better understanding of the invention, reference should be had to the following drawing wherein.

BEST MODE FOR CARRYING OUT THE INVENTION

Figure 1:
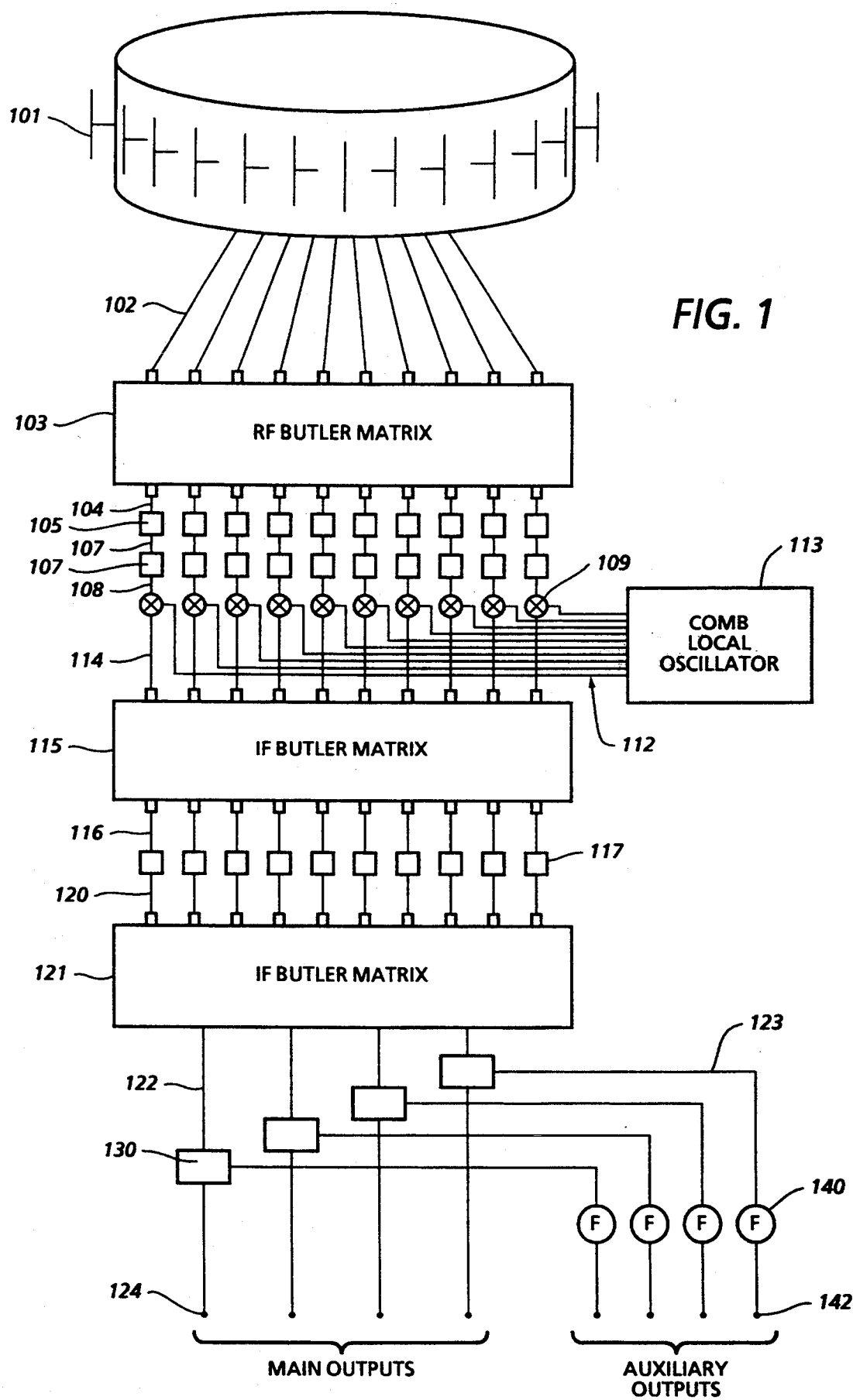
FIG. 1 is a block diagram of a phased array antenna and receiver front-end, illustrating the present invention.

The present invention overcomes the practical limitations of prior art multiple beam cylindrical antenna systems that require separate receivers, and provides all of the advantages of the aforementioned objectives simultaneously with a single configuration.

The antenna/receiver system of the present invention creates a set of contiguous beams of sensitivity which are scanned through a designated coverage sector within the time period of the shortest emitter pulse. Such rapid scan is obtained by heterodyne techniques. The scan results in a predictably compressed pulse (as in the case of a compressive receiver) whose time of occurrence is directly related to the emitter azimuth location.

The present invention avoids sampling loss by using different beams to sample the incident signal continuously during its entire time or presence. As a result, the present invention can yield a sensitivity improvement of N times (where N is the number of array elements) relative to that of the prior implementations which involved the scanning of a single beam. In these prior implementations an incident pulse is sampled by the system for only a fraction of its width as the single beam sweeps by its incidence direction; this limits system sensitivity since only a fraction of the available pulse energy is delivered to the antenna/receiver output.

The manner of beam combination utilized in the present invention results naturally in a narrow bandwidth channelization of signals in accordance with their frequency, in effect, doing the fine-grain filtering required in a high resolution channelized receiver without requiring the use of narrow-band filters.

To clearly illustrate various novel aspects of the current invention, a specific example of an N element cylindrical array incorporating the invention is shown in FIG. 1. The block diagram of FIG. 1 consists of a cylindrical array of antenna elements, 101, N equal length transmission lines 102 which connect elements 101 to the N input ports of an RF Butler matrix 103, N equal length transmission lines 104 which connect the N output ports of the Butler matrix 103 to N fixed delays for focus 105, another set of N equal length transmission lines 107 which connect the N fixed delays 105 to N differential amplitude weights 106, still another N equal length transmission lines 108 connect the set of amplitude weights 106 with a set of N heterodyne mixers 109. N equal length transmission lines 112 connect the N mixers 109 to a comb local oscillator 113. The output ports of the mixers 109 are connected by N equal length transmission lines 114 to the N input ports of IF Butler matrix 115. N equal length transmission lines 116 are used to connect the N output ports of Butler matrix 115 to a set of N fixed delays 117 of progressively differing length. The outputs of the fixed delays 117 are connected by N equal length transmission lines 120 to the N input ports of a second IF Butler matrix 121. N equal length transmission lines 122 connect the outputs of the second IF Butler matrix 121 with N signal couplers 130, each signal coupler having two outputs, the more strongly coupled output 124 being a main output of the present invention and the more weakly coupled output being connected via transmission line 123 to a coarse frequency meter 140, each coarse frequency meter having an auxilliary output port 142. Amplifiers could be inserted at the input and output of the mixers in a practical implementation but they have been omitted from FIG. 1 because their presence is not required for the purpose of explaining the invention.

The present invention provides all the capabilities as Ser. No. 899,629, although frequency resolution is provided to a lesser degree than previously; yet the present invention has fewer output ports and thus provides for more efficient post detection signal processing.

The present invention is an improvement over Ser. No. 899,629 for applications which would benefit from a reduction of post receiver hardware.

FIG. 1 describes the first embodiment of the invention. The diagram is similar to FIG. 2 of Ser. No. 899,629 except that the coarse channelizers of FIG. 2 have been deleted and N means for coarse frequency measurement designated by numeral 140 in FIG. 1 have been added. The latter devices 140 can be any of the many means for this purpose familiar to those in the art, including such frequency-to-voltage converters as frequency discriminators and ratio detectors, frequency-to-time converters such as dispersive delay lines, and frequency-to-phase converters such as are used in "instantaneous-frequency-measurement" (IFM) devices. The main outputs 124 of the system are used to detect signal presence and the information content of the received signals as well as to determine time of signal arrival and direction of signal arrival. The main outputs 124 also indicate with fine precision, the frequency of the incident signals. The auxiliary outputs 142 of the system in FIG. 1 are used to provide frequency indications with coarse precision for the purpose of eliminating ambiguities in frequency determination. The approximate frequency of the incident signal at auxiliary output 142 of a frequency meter 140 is compared to the plurality of fine channelized frequencies appropriate to the particular output port of the second IF Butler matrix 121 to which output port the meter 140 and associated coupler 130 are attached. This identifies the fine channelized frequency closest in magnitude to the frequency indicated at the meter as the correct estimate of incident signal frequency, and thereby eliminates the ambiguities caused by the remaining plurality of fine channelized frequencies.

Operation of the system of FIG. 1, through the second IF Butler matrix is the same as for that of FIG. 2 of Ser. No. 899,629. Therefore, the detailed description of signal propagation through this part of the system (including the mathematical analyses) which is presented in Ser. No. 899,629, is also applicable to the present invention. However, to facilitate a general understanding of the present invention without reference to this detailed prior art description, the functions of the components of FIG. 1 are briefly described below.

An incident wavefront induces a distribution of currents on the radiator elements of cylindrical array 101. This distribution is coupled to the RF Butler matrix 103 where it is decomposed into component signals which are the Fourier spatial harmonics of the distribution. Thence, the component signals are coupled to a set of delay lines 105 which provide time-invariant differential delays and phase shifts. This action renders the component signals cophasal for a particular direction of wavefront incidence; cophasing (or focusing) preconditions the component signals prior to their combination for the purpose of beamforming. Next, the component signals are coupled to a set of differential amplitude weights, 106, which provide preconditioning to control the shape of beams formed by subsequent component-signal combination. The amplitude weights can be in accordance with any distribution affording great flexibility of beam-shape control. For example, if narrow beams with highly suppressed sidelobes are desired, then the weights might be chosen to provide component signals with a Tchebychef-type amplitude distribution.

Next, the preconditioned (focused and weighted) component signal s are coupled to a set of frequency converters composed of heterodyne mixers 109 and a comb local oscillator (LO) 113. This comb LO supplies as many signal outputs as there are component signals. Each LO signal output is monochromatic, but the frequency of each is offset from that of the preceding one so that the frequencies of the set form a linear progression with a common difference frequency. Each of the LO signals is synthesized from a common source so that the set is coherently related in the sense that, at the same point in each cycle of the common difference frequency, the sinusoids representing the LO signal s will simultaneously reach their peaks. The comb LO and set of mixers convert the radio-frequency (RF) component signals to intermediate-frequency (IF) component signals. In the process of frequency conversion, the differential frequency offsets of the LO signals are added to the IF component signals. However, a frequency offset is equivalent to a phase shift which increases linearly with time at a rate equal to $2\pi$ radians per cycle of the offset frequency. Thus, the frequency converters provide a means for adding time-variant differential phase shifts to the component signals for purposes of scanning the beams subsequently formed. Each time $2\pi$ radians differential phase shift is added between adjacent component signals, a beam scan is completed. Therefore, the beam scan rate is equal to the common difference frequency. The phase shifts are added without the need for electronic phase shifters or phase-shifter control signals and there is no limitation (other than mixer bandwidth) on the rate at which the phase shifts are added. Thus the beam scanning rate may be chosen sufficiently high so that the beam samples the incident wavefront at or above the Nyquist rate (at least twice the highest frequency present in the information content of the incident wavefront.)

After frequency conversion, the IF component signals are applied to the first IF Butler matrix 115. Therein, the component signals are combined to form as many contiguous beams of sensitivity as there are component signals. Since the beams are scanning, each beam signal is modulated by its beam shape pattern (radiation pattern) as the beam sweeps past the direction of the incident wavefront. The modulation envelopes of beam signals from adjacent beams are similar but are displaced in time of occurrence by the quotient of the beam angular separation divided by the beam scan rate (which is $2\pi$ times the common difference frequency). The beam signals leaving the first IF Butler matrix are applied to a set of fixed differential delays 117; these delays cause the modulation envelopes to occur synchronously. The values of the delays form an arithmetic progression, with a common difference equal to the time of occurrence displacement between adjacent beam signals. The delays also add a frequency dependent phase shift (which is proportional to their lengths ) to the beam signals. After leaving the delay line set, the beam signals are applied to the second IF Butler matrix 121. Therein, the beam signals are combined so as to cause coherent addition selectively at different output ports of this second IF Butler matrix for different signal frequencies. The channelization of signal by frequency occurs because of the frequency dependent phase shifts previously added to the beam signals by the delay lines, and the characteristic of the Butler matrix which separates signals in accordance with the phase slope across its set of inputs. The outputs of the second IF Butler matrix contain signals which are cataloged by output port number in accordance with their frequency. Fine channelization is provided, the degree of fineness being equal to the beam sweep rate, as explained in patent application Ser. No. 899,629 and in U.S. Pat. No. 4,652,879 columns 7, 8, and 9. However, the signal cataloging is in accordance with a periodic function of frequency so that multiple signals, spaced apart in frequency by N times the beam sweep rate, will appear at the same output port. This would present an ambiguity in frequency measurement and somewhat degrades the multiple-signal resolution capability unless means are provided to correct this deficiency. The coarse frequency meters 140 of the present invention are used to resolve the ambiguities in frequency measurement, while the moderate degradation of multiple signal resolution is accepted as a reasonable price for having fewer output ports than that required for more complete multiple signal resolution.

An alternative embodiment of the present invention does not include the coarse frequency meters 140 and accomplishes their function of eliminating the frequency ambiguities in a manner analagous to the way in which staggered PRF's allow resolution of velocity (frequency) ambiguities in radar. In this alternative embodiment of the present invention, multiple beam scanning rates are used to achieve sets of response curves versus frequency which are staggered relative to each other. Then responses subject to each of the beam scanning rates are compared in an algorithm which resolves the frequency ambiguity (See Barton, David K., "Radar Systems Analysis", pp. 221-223, Artech House Inc., 1976). $F_1$-$F_7$ of FIG. 7.10 (Barton) are analogous to outputs 1-N of the present invention. If the beam scanning rate is changed, the bandwidth of each output changes; thus a given frequency may fall in a different output. Also, $f_r$ of FIG. 7.11 (Barton) is analogous to N times the beam scanning rate of the present invention. The multiple beam scanning rates may be achieved either with time multiplexing or by use of parallel processing. In the time multiplex case, scanning rates are two or three times higher than in the parallel processing case to maintain 100 percent probability of intercept. In the parallel processing case, the signals emerging from the RF Butler matrix 103 (or from the RF preamplifiers following the RF Butler matrix if they are used) are divided and applied to a plurality of parallel systems (mixers 109 through to second IF Butler matrix 115).

Alternative equivalent systems are considered within the scope of the invention. For example, alternative systems derived by the addition of a set of amplifiers prior to the mixing process or after the mixing process or the addition of preselector filters or attenuators or receiver/transmit duplexers or any other set of devices normally found in the front end of the receiver are considered within the contemplations of the current invention because these devices do not alter the intent or the manner of operation of the invention, although to the extent that the transmission parameters of such devices fail to track each other, they can degrade performance.

All of the alternative equivalent forms of the invention have in common the following essence of the invention; means to form multiple, time-sequenced outputs, each output corresponding to a different beam of sensitivity which scans the full coverage sector and together with the other outputs forms a contiguous set of such beams which both fill the coverage sector at any one time and scan the full coverage synchronously as a function of time; means to differentially delay the time-sequenced outputs corresponding to an emitter at a fixed direction, so that the modulation envelopes of these outputs occur in unison; means to coherently combine the time-aligned output selectively at different output ports for different emitter frequencies; and means to distinguish between non-simultaneous multiple outputs at a single output port from emitters having frequencies corresponding to grating lobe responses. Although an azimuth plane is used for reference purposes, the present invention is capable of functioning in the same manner regardless of the plane in which the antenna elements lie.

While in accordance with the patent statutes, only the best mode and preferred embodiment of the present invention has been presented in detail, for the true scope and breadth of the invention, reference should be had to the appended claims.

What is claimed is:

1. An apparatus for adding the capability to separate multiple signals and eliminating the sampling loss of signal energy in antenna systems having a coverage sector through which the antenna system scans at a rate that is faster than the information rate being received, comprising;
   (a) a cylindrical phased array antenna comprising a plurality of radiator elements evenly spaced around a circular arc:
   (b) means for decomposing the distribution of current on the radiator elements caused by electromagnetic wave incidence into component signals which are the Fourier spatial harmonics of the distribution;
   (c) means for forming a plurality of beams of sensitivity from said component signals, said plurality of beams of sensitivity being equal in number to the number of antenna elements in said circular arc, the beams being contiguous and considered as lying in the azimuth plane for reference purposes, with each beam being generally evenly spaced from the adjacent beams in $\theta$ space, where $\theta$ is the angle away from boresight in the azimuthal plane, the spacing between beam center directions in $\theta$ space being generally proportional to the reciprocal of the number of antenna elements, and the beams, taken together to form a larger composite beam, span the entire azimuth coverage sector;

(d) means to differentially weight the amplitude of said component signals to achieve a desired time invariant relative weighting of the signals for beam shape control;

(e) means to differentially delay and phase shift said component signals to achieve a desired time invariant relative phasing of the signals for beam focusing;

(f) means to differentially phase shift these component signals at rates exceeding $7\pi$ radians per cycle of the highest frequency present in the information content of the incident electromagnetic wave for synchronously scanning each of the beams over the entire coverage sector, the beams maintaining their relative positions adjacent one another in $\theta$ space during scanning, the scanning being carried out periodically at a rate that is at least twice as fast as the highest information rate being received;

(g) means for accepting signals received by each beam and differentially delaying said beam signals to cause their modulation envelopes to respond in unison to a single emitting source at a particular azimuth angle;

(h) means for coherently combining said beam signals after said beam signals have been differentially delayed, said means for combining being arranged to cause coherent addition selectively at different output ports for different signal frequencies; and (i) means for measurement of the approximate frequency of said combined beam signals for eliminating ambiguities in determination of signal frequency.

2. An apparatus as in claim 1, further comprising:

(a) a real-time discrete Fourier transformer having a number of input ports equal to the number of radiator elements and an equal number of output ports;

(b) said means to differentially weight the amplitude of said component signals comprising a plurality of attenuators;

(c) said means to differentially delay and phase shift said component signals comprising a plurality of networks each network consisting of a section which provides nondispersive delay and a section which provides differential phase shift which is constant with frequency;

(d) said means to differentially phase shift said component signals linearly versus time comprising a number of heterodyne mixers equal to the number of output ports of the Fourier transformer, and means for generating a number of local oscillator signals equal to the number of mixers, the frequency of each local oscillator signal being offset from that of the preceeding one so that the frequency from the first to the last of the signals form a linear arithmetic progression with a common difference equal to the beam scanning rate, the means for generating the local oscillator signals producing signals which are coherently related so that at the same point in each cycle of the common difference frequency, the sinusoidal variations of the local oscillator signals will simultaneously reach their peaks;

(e) said means for forming a plurality of beams comprising an intermediate frequency beam-forming network having a plurality of input ports equal to the number of mixers with each of said input ports being coupled to a separate output port of one of said mixers, and said intermediate beam-forming network having a plurality of output ports equal to the number of beams;

(f) said means for differentially delaying a plurality of signals comprising a plurality of delay lines equal in number to the number of beams, each delay line being designated by the same number as the beam-forming network output port to which it is coupled, the delay of each delay line being offset from that of the preceding one in the order of its arithmetic designation to order the delays of the delay lines from the first to the last in a linear arithmetic progression with a common difference equal to the reciprocal of the product of the number of beams times the beam scanning rate;

(g) said means for coherently combining a plurality of signals comprising a second intermediate-frequency beam-forming network having a plurality of input ports equal to the number of delay lines, with each of said input ports being coupled to the output port of a corresponding said delay line, and said second intermediate-frequency beam-forming network having a plurality of output ports equal to its number of input ports; and (h) said means for measurement of approximate frequency comprising a plurality of wave coupler and frequency meter pairs, each said pair comprising a wave coupler and a frequency meter, said pairs being equal in number to the number of output ports of the second intermediate-frequency beam-forming network, each wave-coupler having an input port coupled to an output of said beam-forming network, each wave-coupler having first and second output ports, said first wave-coupler output port providing a main system output port, said second wave-coupler output port being connected to an RF input of the frequency meter, and an output of said frequency meter being an auxiliary system output.

3. A process for adding the capability to separate multiple signals and for eliminating the sampling loss of signal energy in antenna systems having a coverage sector through which the antenna system scans at a rate that is faster than the information rate being received, comprising the steps of:

(a) providing a cylindrical phased array antenna comprising a plurality of radiator elements evenly spaced around a circular arc;

(b) decomposing the distribution of current on the radiator elements caused by electromagnetic wave incidence into component signals which are the Fourier spatial harmonics of the distribution;

(c) forming a plurality of beams of sensitivity from said component signals, said plurality of beams of sensitivity being equal in number to the number of antenna elements in said circular arc, the beams being contiguous and considered as lying in the azimuth plane for reference purposes, with each beam being generally evenly spaced from the adjacent beams in $\theta$ space, where $\theta$ is the angle away from the boresight in the azimuthal plane, the spacing between beam center directions in $\theta$ space being generally proportional to the reciprocal of the number of antenna elements, and the beams, taken together to form a larger composite beam, span the entire azimuth coverage sector;

(d) differentially weighting the amplitude of said component signals to achieve a desired time invariant relative weighting of the signals for beam shape control;

(e) differentially delaying and phase shifting said component signals to achieve a desired time invariant relative phasing of the signals for beam focusing;

(f) differentially phase shifting these component signals at rates exceeding $4\pi$ radians per cycle of the highest frequency present in the information content of the incident electromagnetic wave for synchronously scanning each of the beams over the entire coverage sector, while maintaining the beams in their relative positions adjacent one another in $\theta$ space during scanning, the scanning being carried out periodically at a rate that is at least twice as fast as the highest information rate being received;

(g) accepting signals received by each beam and differentially delaying said beam signals to cause their modulation envelopes to respond in unison to a single emitting source at a particular azimuth angle;

(h) accepting said beam signals that have been differentially delayed and coherently combining said beam signals to cause coherent additions selectively at different output ports for different signal frequencies, thereby providing a method for determination of signal frequency with fine precision; and (i) measuring the approximate frequency of the beam signals at each output port for eliminating ambiguities in determination of signal frequency.

* * * * *